United States Patent [19]
Schopfer

[11] Patent Number: 5,640,451
[45] Date of Patent: Jun. 17, 1997

[54] POWER CROSS DETECTION USING LOOP CURRENT AND VOLTAGE

[75] Inventor: Walter S. Schopfer, Austin, Tex.

[73] Assignee: Advanced Micro Devices Inc., Sunnyvale, Ga.

[21] Appl. No.: 630,329

[22] Filed: Apr. 10, 1996

[51] Int. Cl.$^6$ ..................................... H04M 1/24
[52] U.S. Cl. ..................... 379/412; 379/377; 379/382; 379/463
[58] Field of Search ..................... 379/412, 413, 379/377, 373, 382, 30, 418

[56] References Cited

U.S. PATENT DOCUMENTS

| | | | |
|---|---|---|---|
| 3,996,426 | 12/1976 | Lancaster | 379/412 |
| 4,079,210 | 3/1978 | Sanderson | 379/382 |
| 5,038,375 | 8/1991 | Sinberg | 379/398 |
| 5,402,482 | 3/1995 | Minohara et al. | 379/382 |
| 5,406,623 | 4/1995 | Rovik | 379/382 |
| 5,426,695 | 6/1995 | Misu | 379/382 |
| 5,440,612 | 8/1995 | Siligoni et al. | 379/30 |

Primary Examiner—Krista M. Zele
Assistant Examiner—Jacques M. Saint-Surin
Attorney, Agent, or Firm—Foley & Lardner

[57] ABSTRACT

A power cross detection circuit that detects a power cross condition on the ring and tip lines of a telephone system. The power cross detection circuit senses a loop current flowing across a ring feed resistor, as well as a loop voltage at a first node and a second node at opposite ends of the ring feed resistor. Based on these sensed values, a threshold voltage for detecting a power cross condition can be adjusted to detect the power cross condition at a lower voltage value.

10 Claims, 5 Drawing Sheets

POWER CROSS DETECTION USING LOOP CURRENT AND VOLTAGE

BACKGROUND OF THE INVENTION

1. Field of the Invention

The present invention relates to a power cross detection circuit which senses a power cross condition using a loop current and a loop voltage.

2. Background of the Related Art

Figure 1:
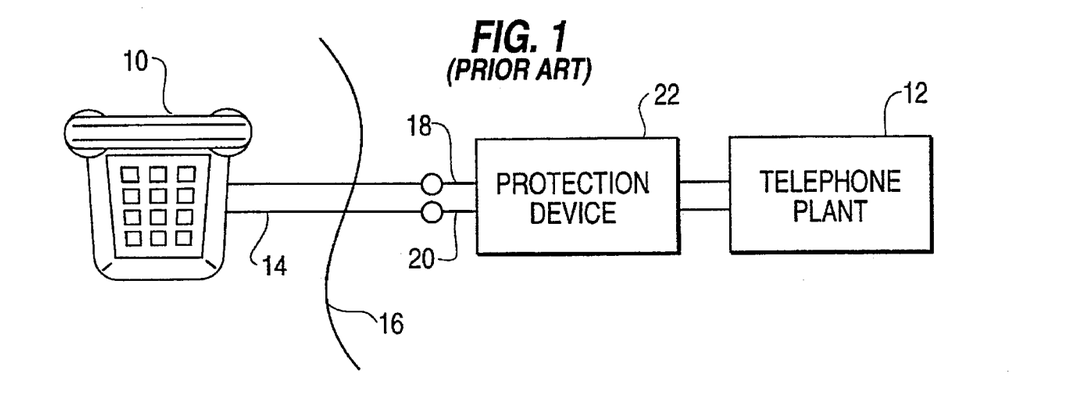
FIG. 1 is a schematic circuit diagram of a typical power-cross test detection circuit.

A terminal connected to a telephone line should periodically undergo a "power-cross" test. This test is performed in order to verify the ability of the terminal to detect the presence of a foreign potential, such as a high voltage of up to 1000 volts AC from a local power company or the like, which may become crossed with the telephone line in an environment outside of the telephone plant. FIG. 1 shows a telephone 10 connected to a telephone plant 12 through wires 14. A power line 16 poses a threat to the telephone plant 12 and any personnel operating the equipment that are connected to the wires 14 that are crossed with the power line 16.

The power-cross typically involves forcing a 1 ampere current into tip and ring lines 18, 20 regardless of the state (i.e., talking, standby or ringing) of the lines, and checking whether the telephone plant 12 survives the test. Generally, in order to provide a 1 ampere current, a 1,000 volt, 60 hertz signal through a 1k ohm resister is applied to the tip and ring lines 18, 20. Other combinations of voltages and resistance values, such as a 600 volt signal through a 600 ohm resistor, or a 50 volt signal through a 50 ohm resistor, could also be used to obtain the 1 ampere current.

Figure 2:
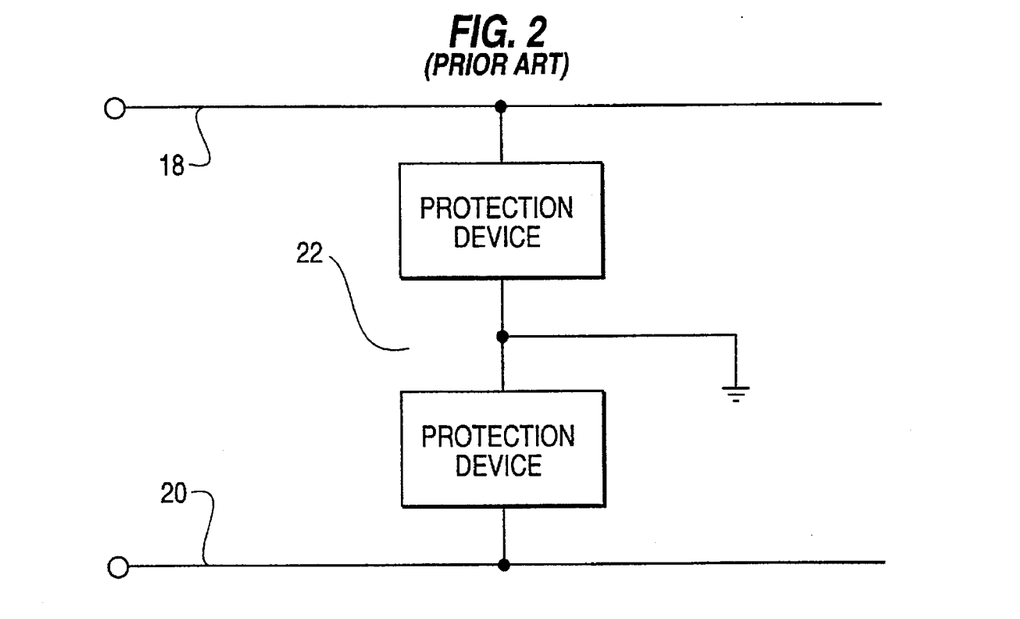
FIG. 2 illustrates the protection device configuration according to the circuit shown in FIG. 1.

As mentioned above, the power-cross test is applied regardless of the state of the telephone plant 12. For example, a person could be talking on the telephone 10, or the telephone 10 could be in a standby mode, or the telephone 10 could be ringing and on-hook. In conventional techniques, during either the talking mode or the standby mode, as shown in FIGS. 1 and 2, a protection device 22, such as a diode or a neon lamp, is connected to ring and tip lines 18, 20 via relays (not shown). When a high voltage, such as an AC power signal, crosses wires 14 (FIG. 1), the current goes through the protection device 22, thereby preventing damage to the telephone plant 12 or telephone 10.

Figure 3:
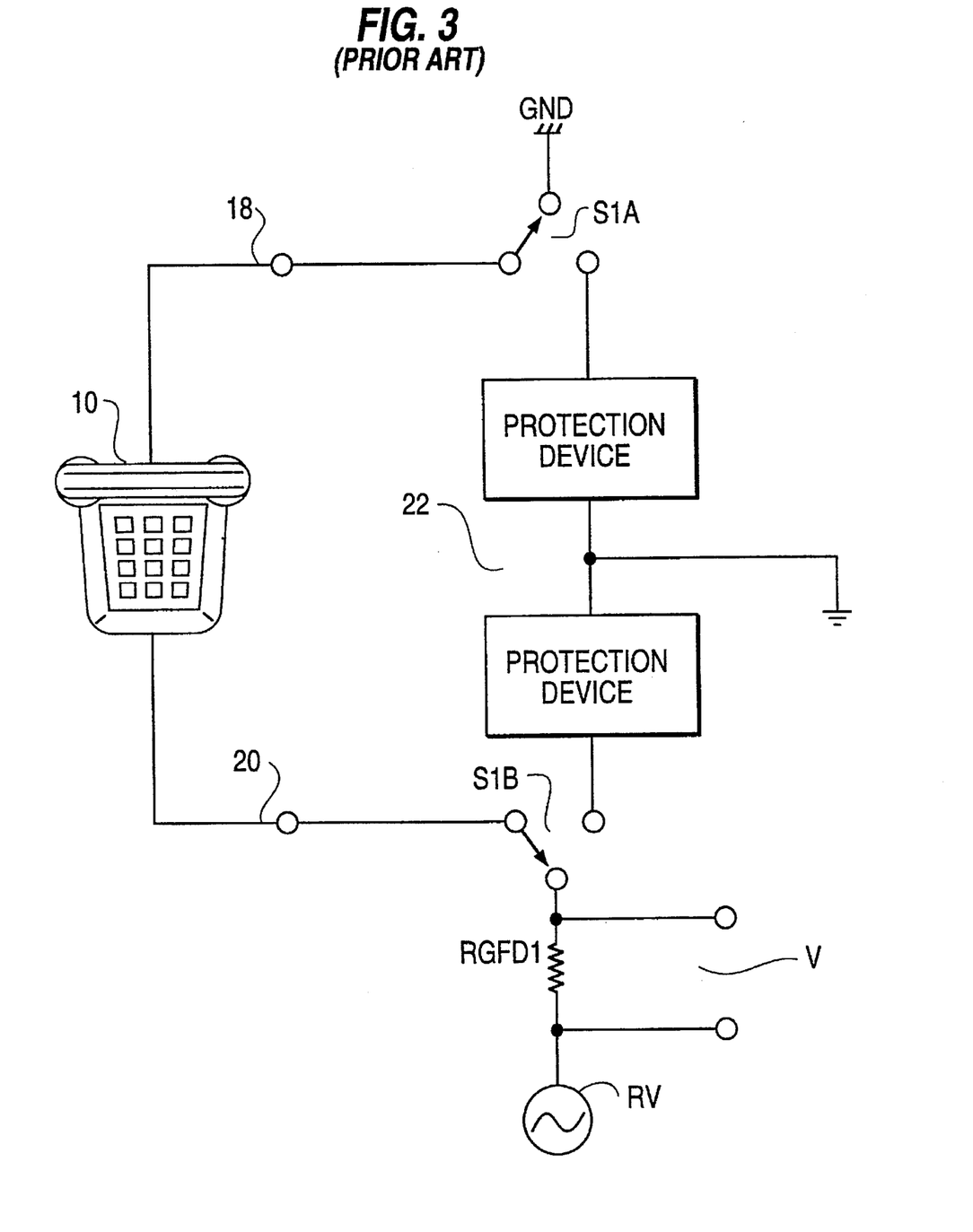
FIG. 3 shows a schematic circuit diagram illustrating the ringing state of the circuit shown in FIG. 1.

As shown in FIG. 3, during the ringing mode, the telephone 10 is connected to ground GND via the tip line 18 and relay S1A, and the ring line 20 is connected to a ringer voltage RV by relays S1A, S1B in order to perform the telephone ringing operation. In this situation, the protection device 22 is disconnected. Thus, although there is some kind of protection provided in the talking and standby modes, there is no protection provided if a power-cross condition occurs during the ringing mode.

SUMMARY OF THE INVENTION

The present invention provides a technique for detecting a power-cross condition during the ringing mode of a telephone, in order to protect the telephone and the telephone plant by providing a signal used to quickly switch ring relays to connect up to a protection device.

Accordingly, in a first embodiment, the present invention relates to an apparatus that detects a presence of a power cross condition on a telephone line during a ringing state, with the telephone line including a ring feed resistor connected at a first end to a ring line. The apparatus includes means for detecting the ringing state on the telephone line. The apparatus also includes first voltage determination means for determining a first voltage at the first end of the ring feed resistor. The apparatus further includes first voltage comparison means for determining whether the first voltage exceeds a threshold voltage, a state in which the first voltage exceeds the threshold voltage corresponding to the detected power cross condition. The apparatus still further includes second voltage determination means for determining a second voltage at another end of the ring feed resistor. The apparatus also includes second voltage comparison means for comparing the first voltage to the second voltage, with the comparison means outputting an adjustment signal corresponding to a difference between the first and second voltages if the second voltage is greater than the first voltage. The adjustment signal is used to change the threshold voltage for future detections of the power cross condition.

In a second embodiment, the present invention relates to an apparatus for detecting a presence of a power cross condition on a telephone line during a ringing state, with the telephone line including a ring feed resistor connected at a first end to a ring line. The apparatus includes means for detecting the ringing state on the telephone line. The apparatus also includes first voltage determination means for determining a first voltage at the first end of the ring feed resistor. The apparatus further includes first voltage comparison means for determining whether the first voltage exceeds a threshold voltage, a state in which the first voltage exceeds the threshold voltage corresponding to the detected power cross condition. The apparatus still further includes loop current detection means for determining whether a ringing current based on the ringing condition is flowing from the first end to the second end of the ring feed resistor, with the loop current detection means outputting a loop direction signal as a result thereof. The loop direction signal is used to change the threshold voltage for future detections of the power cross condition.

The present invention further relates to a method of detecting a presence of a power cross condition on a telephone line during a ringing state, with the telephone line including a ring feed resistor connected at a first end to a ring line. The method includes a step of detecting the ringing state on the telephone line. The method also includes a step of determining a first voltage at the first end of the ring feed resistor. The method further includes a step of determining whether the first voltage exceeds a threshold voltage, a state in which the first voltage exceeds the threshold voltage corresponding to the detected power cross condition. The method still further includes a step of determining whether a ringing current based on the ringing condition is flowing from the first end to the second end of the ring feed resistor, and outputting a loop direction signal as a result thereof. The loop direction signal is used to change the threshold voltage for future detections of the power cross condition.

For a better understanding of the present invention, reference is made to the following description and accompanying drawings, while the scope of the invention will be pointed out in the appended claims.

BRIEF DESCRIPTION OF THE DRAWINGS

These and other objects and advantages of the invention will become more apparent from the following detailed description when read in conjunction with the accompanying drawings with like reference numerals indicating corresponding parts throughout, and wherein.

DETAILED DESCRIPTION OF THE PREFERRED EMBODIMENTS

Figure 4:
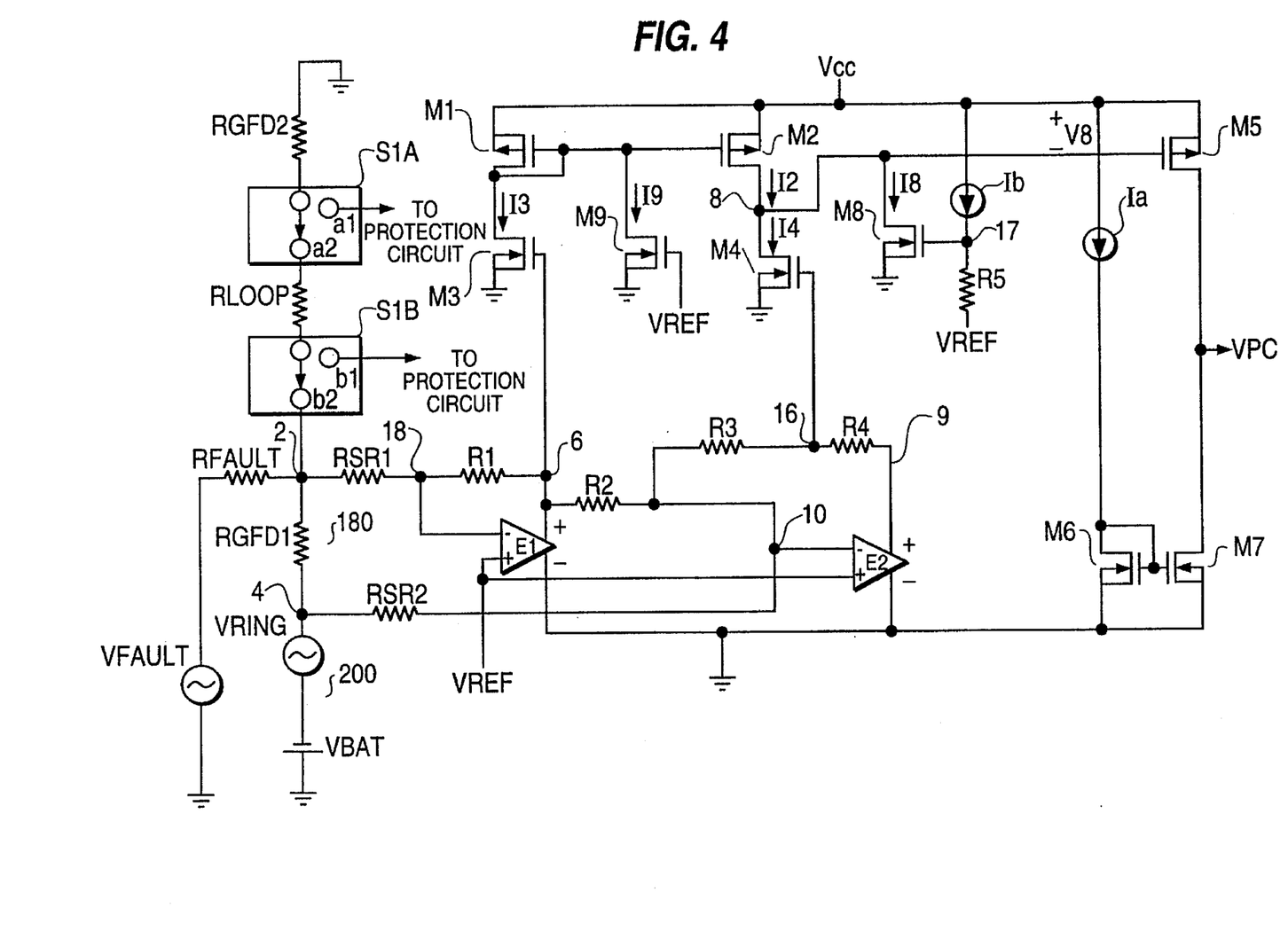
FIG. 4 is a diagram of the power cross detection circuit according to the invention.

Referring now to the drawings, and more particularly to FIG. 4, there is shown a circuit for detecting a power cross condition according to the instant invention. Before describing the circuit as shown in FIG. 4, it is useful to describe other types of power cross detecting circuits. One such power cross detection circuit is described in copending U.S. patent application 08/483,868, by the present inventor and S. Ramirez, and assigned to AMD, Inc., which is incorporated herein by reference.

Figure 5:
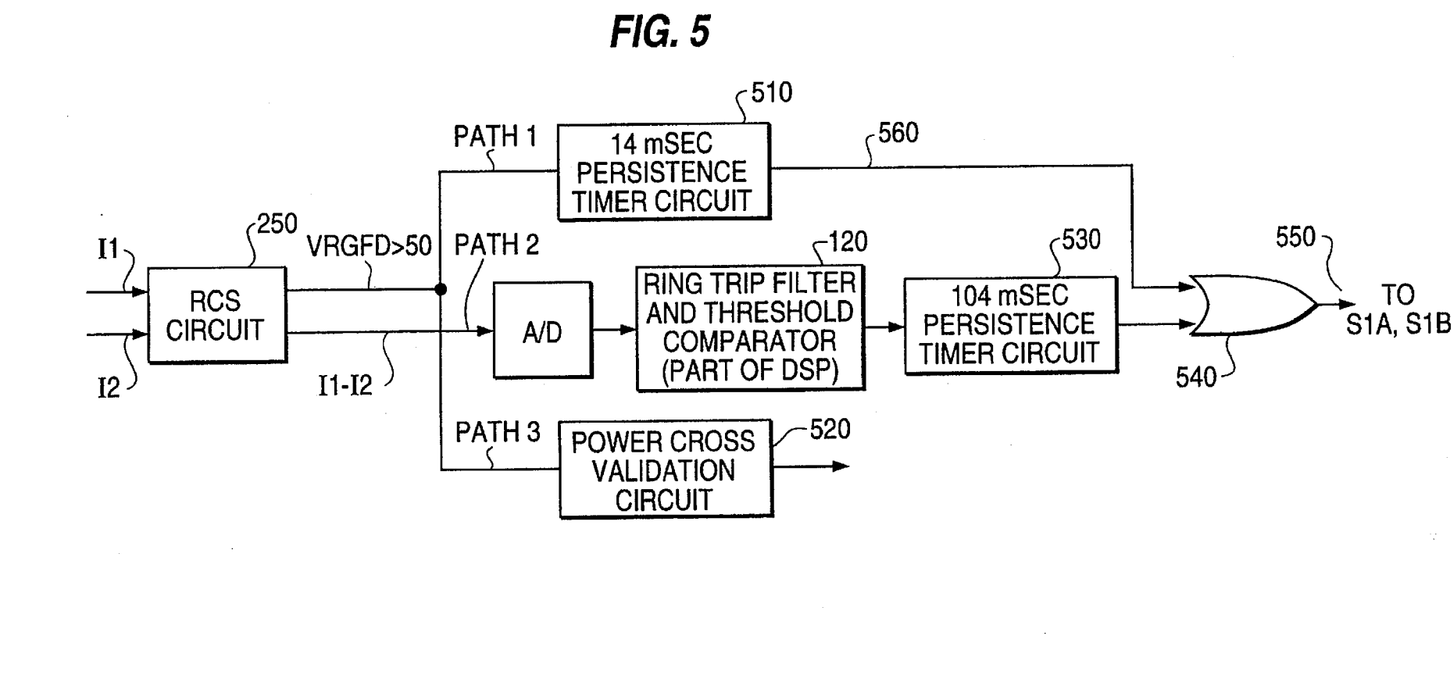
FIG. 5 is a block diagram of a power cross detection circuit of a related patent application.

In the circuit described in the Ser. No. 08/483,868 application, and which is shown in FIG. 5, a first output signal (Vrgfd>50) from a ring current sensor circuit 250 is used to detect a condition in which the voltage across a ring feed resistor (not shown) is above a predetermined value, such as 50 volts. The first output signal is fed through a first path (Path 1), which includes a first persistence timer circuit 510. A second output signal from the ring current sensor circuit 250 is used to monitor a difference in current flowing across first and second sense resistors (not shown) connected to respective input ports of the ring current sensor circuit 250. The second output signal is fed through a second path (Path 2), which includes an analog-to-digital converter (A/D), a ring trip filter and comparator 120, and a second persistence timer circuit 530. The second persistence timer circuit 530 has a persistence time greater than that of the first persistence timer circuit 510. A third path (Path 3) connects the ring current sensor circuit 250 to a power cross validation circuit 520. The power cross validation circuit 520 receives the first output signal (Vrgfd>50) from the ring current sensor circuit 250. The outputs of the first and second persistence timer circuits 510, 530 are fed to an OR gate 550, which outputs a relay switch signal to relays (not shown) coupled to ring and tip lines (not shown), so that a detected power cross condition on the ring and tip lines will not harm components that are connected on the ring and tip lines.

Turning our attention now to the power cross detection circuit of the system according to the invention, FIG. 4 shows the components used therein. The circuit as shown in FIG. 4 is used to detect a power cross condition while ringing is present on a telephone line. The circuit of FIG. 4 monitors the voltage across the loop and the current through the loop to minimize the voltage at which a power cross is uniquely detected. As described earlier, a power cross condition is a condition in which a telephone line is accidently connected to another power source, such as power mains, that are represented by a voltage VFAULT and a resistance RFAULT in FIG. 4.

A possible scheme to detect a power cross condition would be to sense when the voltage at node 2 is greater than a certain threshold voltage level, and when this condition is sensed, to set a flag to indicate the power cross condition. The threshold level must be set above the highest expected ringing level in order to eliminate the possibility of a ringing voltage causing an inadvertent power cross detection. In many types of telephone administrations, the peak ringing level is less than −200 volts. Therefore, the power cross threshold might be set at −220 volts, for example, in order to prevent a normal ringing signal from being detected as a power cross condition.

A problem occurs in this scheme when lower ringing voltages are used. In this case, the power dissipated by the first ring feed resistor RGFD1, while a power cross is present but below the detection threshold, is higher. This places more continuous stress upon the first ring feed resistor RGFD1 and the ringing generator. The ringing generator is located on the ring line, and is indicated as oscillator VRING and battery VBAT in FIG. 4. The power cross detection circuit of the system according to the invention reduces this stress by automatically reducing the power cross detection threshold when lower ringing voltages are used.

In addition to the loop voltage, the power cross detection circuit of the system according to the invention uses the loop current level to modify the detection threshold level. Thus, both the loop voltage level and the loop current level are used to provide a power cross detection.

Under normal conditions when no power cross is present, the magnitude of the voltage V2 at node 2 is always equal to or less than the magnitude of the voltage V4 at the node 4. Nodes 2 and 4 are at opposite sides of the first ring feed resistor RGFD1, as seen in FIG. 4. The voltage drop (V2-V4) across the first ring feed resistor RGFD1 is proportional to the current flowing in the telephone loop (i.e., the loop current). The voltages V2, V4 on either side of the first ring feed resistor RGFD1 are sensed by a pair of sense resistors RSR1, RSR2 that are respectively connected on opposite ends of the first ring feed resistor RGFD1.

In the normal, non-power cross case, the threshold level is not modified very much. During a power cross condition, however, the magnitude of the voltage V2 at the node 2 can exceed the magnitude of the voltage V4 at the node 4, thereby reversing the current across the first ring feed resistor RGFD1. The power cross detection circuit of the system according to the invention senses this "reverse current" condition, and adds to the level of the voltage feeding the power cross comparator. That way, a lower power cross detection threshold is used to detect an actual power cross condition.

In the power cross detection circuit of FIG. 4, the output of op amp E1 is inversely proportional to the voltage V2 at the node 2. The inverting (−) input of op amp E1 is connected between a first sense resistor RSR1 and a resistor R1, and the non-inverting (+) input of op amp E1 is connected to a reference voltage Vref. The output of op amp E1 is connected to the inverting input of op amp E2 via a resistor R2, and the non-inverting input of op amp E2 is connected to the reference voltage Vref.

The output of op amp E2 is directly proportional to the loop current flowing through the first ring feed resistor RGFD1 from node 2 to node 4. The gate of field effect transistor M9 is also connected to a reference voltage Vref, and the drain of transistor M9 is mirrored to the drain of field effect transistor M2. This effectively cancels the drain current i4 from transistor M4.

In order to consider the operation of the power cross detection circuit of FIG. 4, assume that the current sensing circuit is disabled. To do this, disconnect the gate of transistor M4 from node 16 and connect it to node 10, which is held at the reference voltage Vref by the feedback around the op amp E2. The only currents that effectively flow in or out of node 8 are currents I2 and I8. Note that current I2 is equal to current I3, because the effect of current I4 has been effectively canceled by current I9. When the voltage V2 at node 2 becomes more negative due to an actual power cross condition, the current I2 increases. When the current I2 exceeds the current I8, the voltage V8 drops below the gate threshold of transistor M5, and M5 turns off. As a consequence, VPC goes low to indicate a power cross condition. Adjusting the values of resistor R5 and/or the current source Ib sets the power cross voltage threshold level.

The explanation given above is for a system that only detects an excessive voltage at node 2. To describe the effect of loop current sensing upon this circuit, assume that the gate of transistor M4 is reconnected to node 16. Now, when the voltage V2 is driven more negative than the voltage V4, the output of the op amp E2 becomes negative, which causes a reduction in the current I4. This action causes the current I2 to dominate, and the voltage V8 at node 8 is driven towards Vcc. This turns off the transistor M5 earlier than it would be if the loop current was not sensed. Hence, the power cross threshold is further reduced by the presence of an abnormal power cross current flowing from node 4 to node 2. Normally, ringing current flows from node 2 to node 4 at the negative peaks of the ringing voltage.

To illustrate this effect, suppose the voltage V4 at node 4 is at −150 volts (which is a typical value of a peak negative ringing voltage). A power cross caused by the power cross voltage VFAULT now forces the voltage V2 at node 2 to −190 volts (for example). Because the voltage drop across the first ring feed resistor RGFD1 is in the opposite direction, the effective power cross threshold is reduced. This happens because the voltage V16 increases in the negative direction as the voltage V2 becomes more negative with respect to the voltage V4. This causes the transistor M4 to draw less current, thereby driving the transistor M5 more towards the off (power cross detected) condition. Hence, a power cross is detected at a lower voltage. If the voltage V4 is changed to a different voltage, the power cross threshold tends to follow this change in voltage, because of the correction provided by the voltage V16.

With the voltage V4 equal to −150 volts, a power cross is detected when V2 is less than −180 volts. If the voltage V4 is changed to −100 volts, for example, then the power cross threshold voltage is reduced (say, to 155 volts). These calculations are based on the component values and equations presented for an example given hereinbelow.

The resistor R5 is used to set the initial threshold, which is based on the highest expected peak negative ringing voltage. In the example described previously, the resistor R5 is set to guarantee that the voltage V2 being greater than −220 volts will not cause a power cross indication.

The effect of current sensing can be varied by changing the value of the resistor R3. Increasing the resistance of resistor R3 will cause the power cross threshold to drop even lower. If the resistance of resistor R3 is increased too much, placing a reactive load (capacitance or inductance) may cause reverse current in the first ring feed resistor RGFD1 during a normal ringing condition. In the preferred embodiment, the circuit according to the invention can accommodate up to 7 µfarads of line capacitance before a false power cross is detected. Of course, the circuit can be modified to handle greater amounts of line capacitance, as is known to those of ordinary skill in the art.

The following description provides a specific example of the circuit according to the invention. In this specific example, R1=3.42 kohms, R2=3.42 kohms, R3=7.5 kohms, R4=7.5 kohms, R5=15 kohms, Ib=66 µamps, RSR1=RSR2= RSR=750 kohms, RGFD1=510 ohms, V4=−150 volts.

The voltage V6 at node 6 is inversely proportional to the voltage V2, and the voltage V16 at node 16 is proportional to the loop current. The voltage V17 at node 17 is determined as:

$$V17=R5*ib+Vref$$

The voltage V6 is determined as:

$$V6=(-V2*(R1/RSR)+Vref))$$

The voltage V16 is determined as:

$$V16=(V2-V4)*(R3/RSR)+Vref$$

We can now determine the drain currents of transistors M5, M4, M9 and M3. idrain=Beta (Vg-Vth)$^2$, where idrain is the drain current of the resistor, Vg is the gate voltage of the transistor, and Vth is the threshold voltage of the transistor. Beta is equal to k'* w/1, where k' is the process parameter for the transistor, w is the channel length of the transistor, and 1 is the channel length of the transistor. For an n-channel device, k' is typically equal to 40×10$^{-6}$, and for a p-channel device, k' is typically equal to 20×10$^{-6}$. For the specific example described herein, Beta=7×10$^{-6}$. Thus, drain currents are determined by the following equations:

$$I8=7*10^{-6}*(V17-Vth)^2$$

$$I4=7*10^{-6}*(V16-Vth)^2$$

$$I9=7*10^{-6}*(Vref-Vth)^2$$

$$I3=7*10^{-6}*(V6-Vth)^2$$

$$I2=I3+I9$$

From I4+I8, subtract I2 and multiply the result by a high resistance (i.e., 1 mega-ohm, which is the approximate resistance at node 8) to obtain V8:

$$V8=(1*10^6*(I4+I8-I2))$$

Vpc=5 if V8 is greater than 0.7 (Vth),

Vpc=0 if Vi is less than or equal to 0.7 (Vth).

Figure 6:
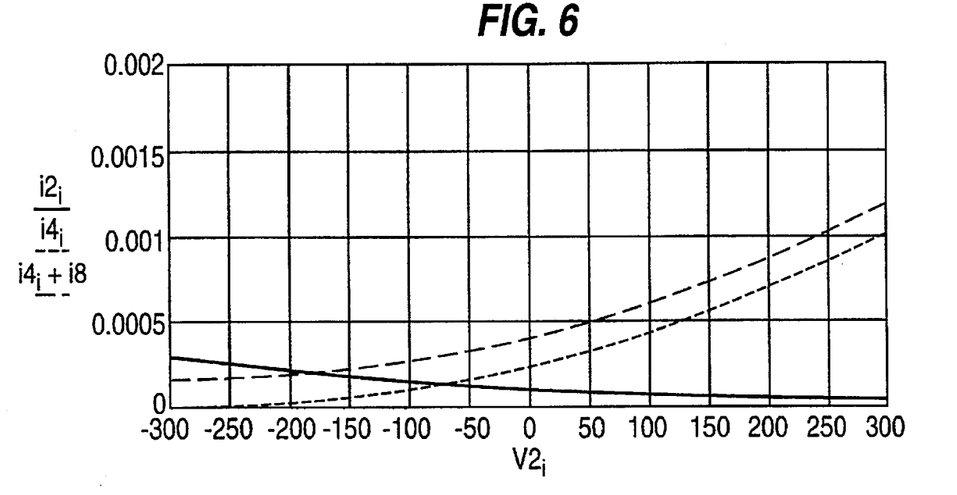
FIG. 6 shows the relationship between currents I2, I4 and I4+I8 as a function of the voltage V2.
Figure 7:
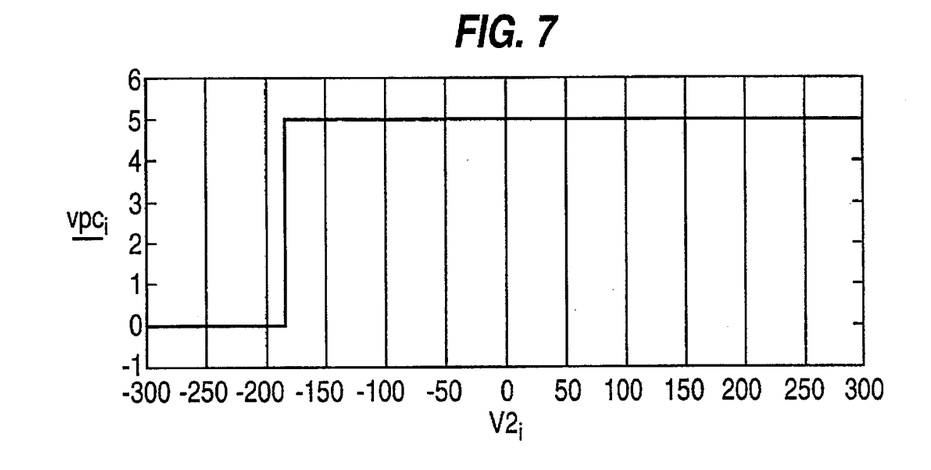
FIG. 7 shows the output signal Vpc as a function of the voltage V2.

Thus, a power cross detection is made by the circuit according to the invention when Vpc=0. FIG. 6 shows curves for I2, I4, and I4+I8, as the voltage V2 varies from −300 volts to +300 volts. FIG. 7 shows the power cross detection signal Vpc as a function of the voltage V2. Note that the power cross detection is made when V2 is more negative than −180 volts.

The integrated ring sensor according to the present invention senses both the loop voltage and the loop current (including its direction) to sense a power cross condition. A signal Vpc is output to indicate a power cross condition when it is set to a high state. Of course, the circuit could be easily modified so that Vpc indicates a power cross condition when it is set to a low state. Using the output signal Vpc, the times when relays S1A, S1B are be switched over from being connected to the ring feed resistors RGFD1, RGFD2 to being connected to a protection circuit (not shown), which may be provided within a subscriber line interface circuit (SLIC, not shown), when a power cross condition is detected.

During the ringing state, the relay switch S1A is connected to one end of the second ring feed resistor RGFD2, with the other end of the second ring feed resistor RGFD2 being connected to a ground GND. Also, during the ringing state, switch S1B is connected to one end of the first ring feed resistor RGFD1, with the other end of the first ring feed resistor RGFD1 being connected to a ring bus 200. This normal ringing state of the relays S1A, S1B is shown in FIG. 4. However, if a power cross condition is detected during the ringing state, the output signal Vpc being at the high state causes the relay switches S1A, S1B to be respectively switched away from the second and first ring feed resistors RGFD2, RGFD1, so that they would instead be connected to a protection circuit 22, such as the one shown in FIG. 3.

In the embodiment shown in FIG. 4, the following values are used for the components for the power cross detection circuit:

| | |
|---|---|
| RGFD1 | 510 ohms |
| RGFD2 | 50 ohms |
| RSR1 | 750 kohms |
| RSR2 | 750 kohms |
| R1 | 3.42 kohms |
| R2 | 3.42 kohms |
| R3 | 7.5 kohms |
| R4 | 7.5 kohms |
| M1 | 30 μm channel width, 4 μm channel length |
| M2 | 30 μm channel width, 4 μm channel length |
| M3 | 4 μm channel width, 24 μm channel length |
| M4 | 4 μm channel width, 24 μm channel length |
| M5 | 30 μm channel width, 4 μm channel length |
| M6 | 12 μm channel width, 3 μm channel length |
| M7 | 12 μm channel width, 3 μm channel length |
| M8 | 4 μm channel width, 24 μm channel length |
| M9 | 4 μm channel width, 24 μm channel length |
| Ia | 28 μampere current source |
| Ib | 66 μampere current source |

While preferred embodiments of the invention has been described herein, modification of the described embodiments may become apparent to those of ordinary skill in the art, following the teachings of the invention, without departing from the scope of the invention as set forth in the appended claims. For example, while the circuit in FIG. 4 is shown with field effect transistors, equivalent devices, such as bipolar junction transistors, could equally be used, and still remain within the scope of the invention.

What is claimed is:

1. An apparatus for obtaining an optimum threshold voltage to detect a presence of a power cross condition on a telephone line during a ringing state, the telephone line including a ring feed resistor connected at a first end to a tip line and connected at a second end to a ring line, the apparatus comprising:

a first voltage determination circuit configured to determine a magnitude of a first voltage at the first end of the ring feed resistor;

a first voltage comparator circuit connected to the first voltage determination circuit and configured to determine whether the magnitude of the first voltage exceeds a threshold voltage, a state in which the magnitude of the first voltage exceeds the threshold voltage corresponding to the detected power cross condition;

a second voltage determination circuit configured to determine a magnitude of a second voltage at the second end of the ring feed resistor; and a second voltage comparator circuit connected to the first and second voltage determination circuits and configured to compare the magnitude of the first voltage to the magnitude of the second voltage, the second voltage comparator circuit outputting an adjustment signal corresponding to a difference between the first and second voltages if the magnitude of the second voltage is less than the magnitude of the first voltage, wherein the adjustment signal is used to change the threshold voltage to the optimum threshold voltage to detect the power cross condition.

2. An apparatus according to claim 1, wherein the ring feed resistor is connected on the first end to a first sense resistor, and on the second end to a second sense resistor.

3. An apparatus according to claim 1, further comprising a detector circuit configured to detect the ringing state on the telephone line.

4. An apparatus according to claim 1, wherein the threshold voltage is changed due to the adjustment signal being outputted by the second voltage comparator circuit in order to detect future power cross conditions at a lower voltage than that previously used to detect power cross conditions.

5. An apparatus for obtaining an optimum threshold voltage to detect a presence of a power cross condition on a telephone line during a ringing state, the telephone line including a ring feed resistor connected at a first end to a tip line and at a second end to a ring line, the apparatus comprising:

a voltage determination circuit configured to determine a magnitude of a first voltage at the first end of the ring feed resistor;

a voltage comparator circuit connected to the voltage determination circuit and configured to determine whether the magnitude of the first voltage exceeds a threshold voltage, a state in which the magnitude of the first voltage exceeds the threshold voltage corresponding to the detected power cross condition; and a loop current detection circuit configured to determine whether a ringing current that exists during the ringing state is flowing from the first end to the second end of the ring feed resistor, the loop current detection circuit outputting a loop direction signal as a result thereof, wherein the loop direction signal is used to change the threshold voltage to the optimum voltage to detect the power cross condition.

6. An apparatus according to claim 5, wherein the ring feed resistor is connected on the first end to a first sense resistor, and on the second end to a second sense resistor.

7. An apparatus according to claim 5, further comprising a detector circuit configured to detect the ringing state on the telephone.

8. A method of obtaining an optimum threshold voltage to detect a presence of a power cross condition on a telephone line during a ringing state, the telephone line including a ring feed resistor connected at a first end to a ring line and at a second end to a tip line, the method comprising the steps of:

a) determining a magnitude of a first voltage at the first end of the ring feed resistor;

b) determining whether the magnitude of the first voltage exceeds a threshold voltage, a state in which the magnitude of the first voltage exceeds the threshold voltage corresponding to the detected power cross condition;

c) determining a magnitude of a second voltage at the second end of the ring feed resistor; and d) comparing the magnitude of the first voltage to the magnitude of the second voltage, and outputting an adjustment signal corresponding to a difference between the first and second voltages if the magnitude of the second voltage is less than the magnitude of the first voltage, wherein the adjustment signal is used to change the threshold voltage to the optimum voltage to detect the power cross condition.

9. A method according to claim 8, further comprising the step of:

prior to the step a), detecting the ringing state on the telephone line.

10. A method of detecting a presence of a power cross condition on a telephone line during a ringing state, the telephone line including a ring feed resistor connected at a first end to a tip line and at a second end to a ring line, the method comprising the steps of:

a) detecting the ringing state on the telephone line;

b) determining a magnitude of a first voltage at the first end of the ring feed resistor;

c) determining whether the magnitude of the first voltage exceeds a threshold voltage, a state in which the magnitude of the first voltage exceeds the threshold voltage corresponding to the detected power cross condition;

d) determining whether a ringing current that exists during the ringing state is flowing from the first end to the second end of the ring feed resistor, and outputting a loop direction signal as a result thereof, wherein the loop direction signal is used to change the threshold voltage to the optimum voltage to detect the power cross condition.

* * * * *